United States Patent [19]
Bond

[11] 3,902,391

[45] Sept. 2, 1975

[54] BANDSAW APPARATUS AND DRIVE ASSEMBLY THEREFORE

[75] Inventor: Harold Urquhart Bond, Vancouver, Canada

[73] Assignee: Hawker Siddeley Canada Ltd., Toronto, Canada

[22] Filed: May 14, 1974

[21] Appl. No.: 469,659

[52] U.S. Cl. .................................. 83/788; 83/814
[51] Int. Cl.² .................... B23D 53/00; B23D 55/06
[58] Field of Search........ 83/788, 792, 803, 814–819

[56] References Cited
UNITED STATES PATENTS 2,274,923    3/1942    Hedgpeth.......................... 83/818 X
2,492,824    12/1949    Ahrndt et al. .......................... 83/815

*Primary Examiner*—Willie G. Abercrombie
*Attorney, Agent, or Firm*—Carver and Company

[57]    ABSTRACT

Bandsaw apparatus in which the driving wheel is mounted for rotation on one end of a tubular housing forming part of the bandsaw frame and is driven by an axle which extends axially through the housing, which is connected at one end to the driving wheel and which is journalled in bearings at the other end of the housing. The other end of the axle which projects out of the housing is a driven end.

2 Claims, 3 Drawing Figures

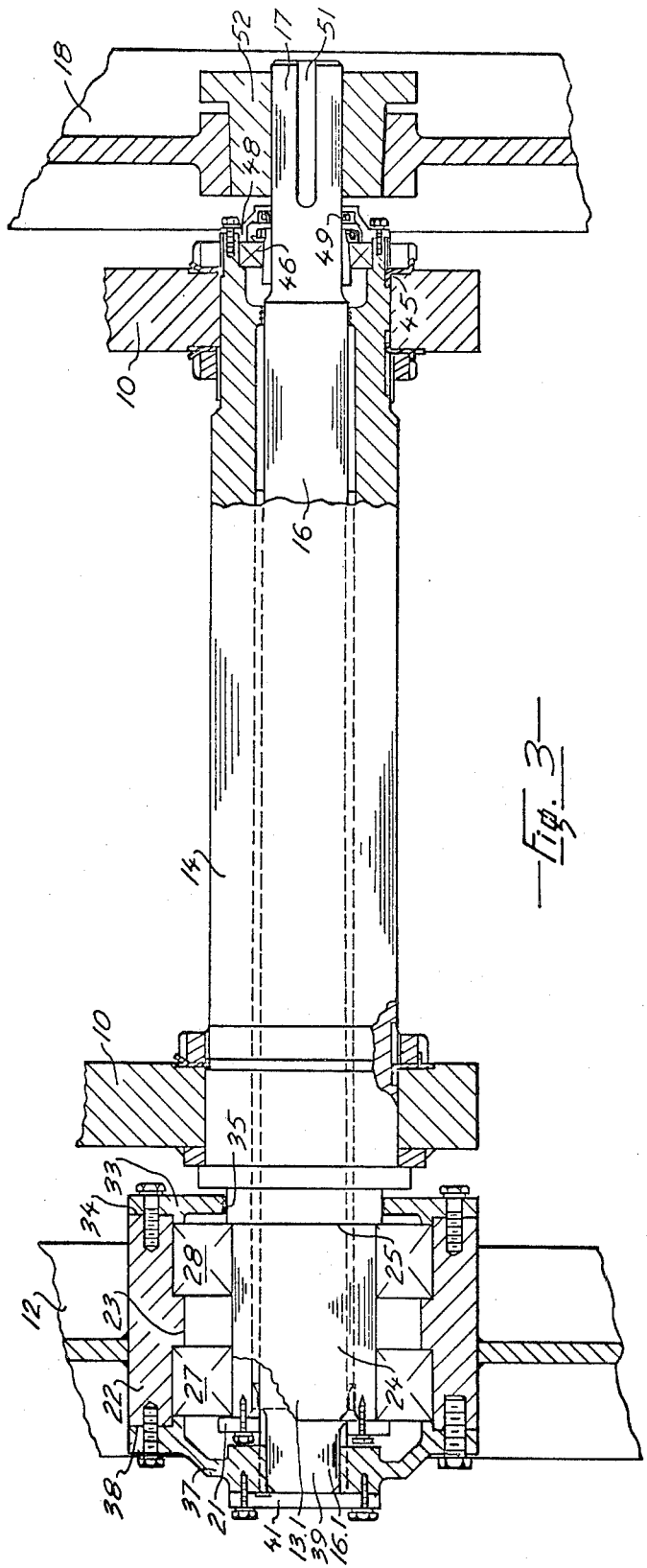

BANDSAW APPARATUS AND DRIVE ASSEMBLY THEREFORE

BACKGROUND OF THE INVENTION

1. Field of the Invention

This invention relates to bandsaw apparatuses, and in particular, to driving assemblies therefore.

2. Prior Art

Conventionally, in bandsaw apparatuses used in the production of lumber an endless bandsaw is trained over a pair of wheels disposed in tandem on a frame. One of the wheels is mounted on an axle rotatably supported in the frame and usually belt driven from a suitable source of power. The other wheel is normally mounted on a tensioning device disposed in the frame which enables the bandsaw proper to be highly tensioned so as to obtain accuracy of cut. The driving axle is, consequently, subject to high cyclic stresses which in time results in axle failure and bearing damage.

In order to reduce effect of cyclic stressing bandsaws have been made in which the driving wheel is mounted for rotation on the frame itself and is belt driven through a pulley connected directly to the driving wheel. This arrangement is, however, not satisfactory as both the pulley and belt are constantly showered with sawdust, resulting in fowling of the belt.

SUMMARY OF THE INVENTION

The present invention provides a bandsaw apparatus; and in particular a drive mechanism therefore, in which the driving wheel is axle driven to enable the driving pulley to be connected to the axle remote from the driving wheel so that the pulley and its driving belt are protected from the sawdust.

In the bandsaw apparatus of the present invention the driving wheel is mounted for rotation on the saw frame and has a driven connection with one end of a driving axle which is mounted for rotation in the frame. A pulley is mounted at the opposite end of the axle for receiving a belt or other driving means.

A detailed description following, related to drawings, gives exemplification of apparatus according to the invention which, however, is capable of expression in means other than those particularly described and illustrated.

DESCRIPTION OF THE DRAWINGS

FIG. 3 is an enlarged front view partially sectioned of a drive arrangement.

DETAILED DESCRIPTION

Figure 1:
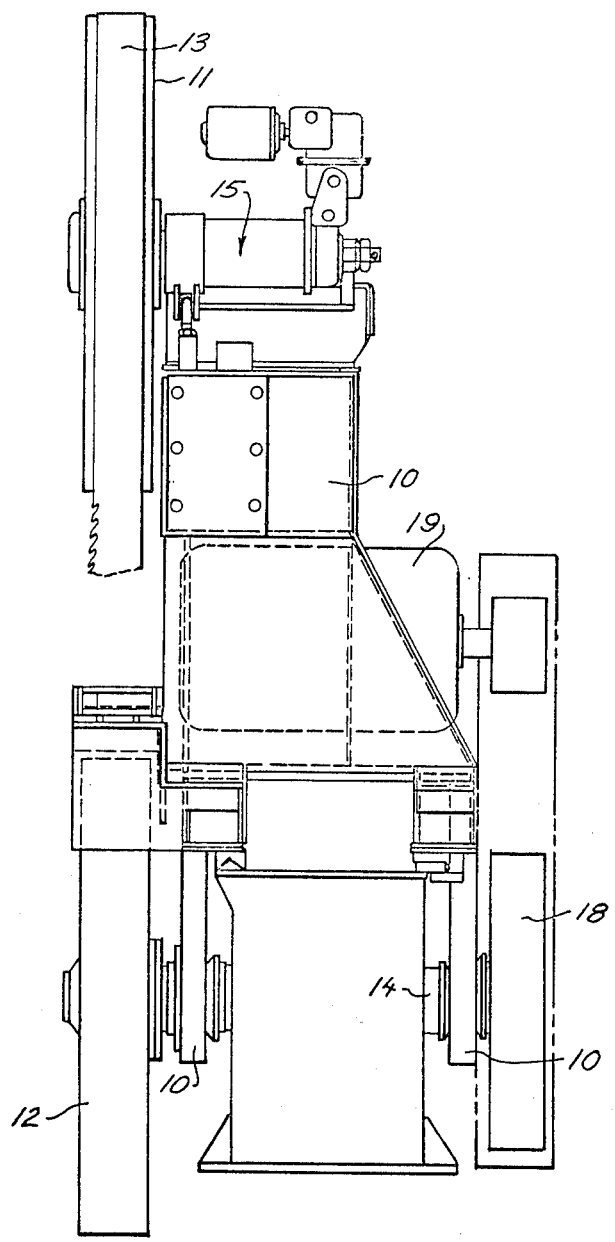
FIG. 1 is a front elevation of the bandsaw apparatus.
Figure 2:
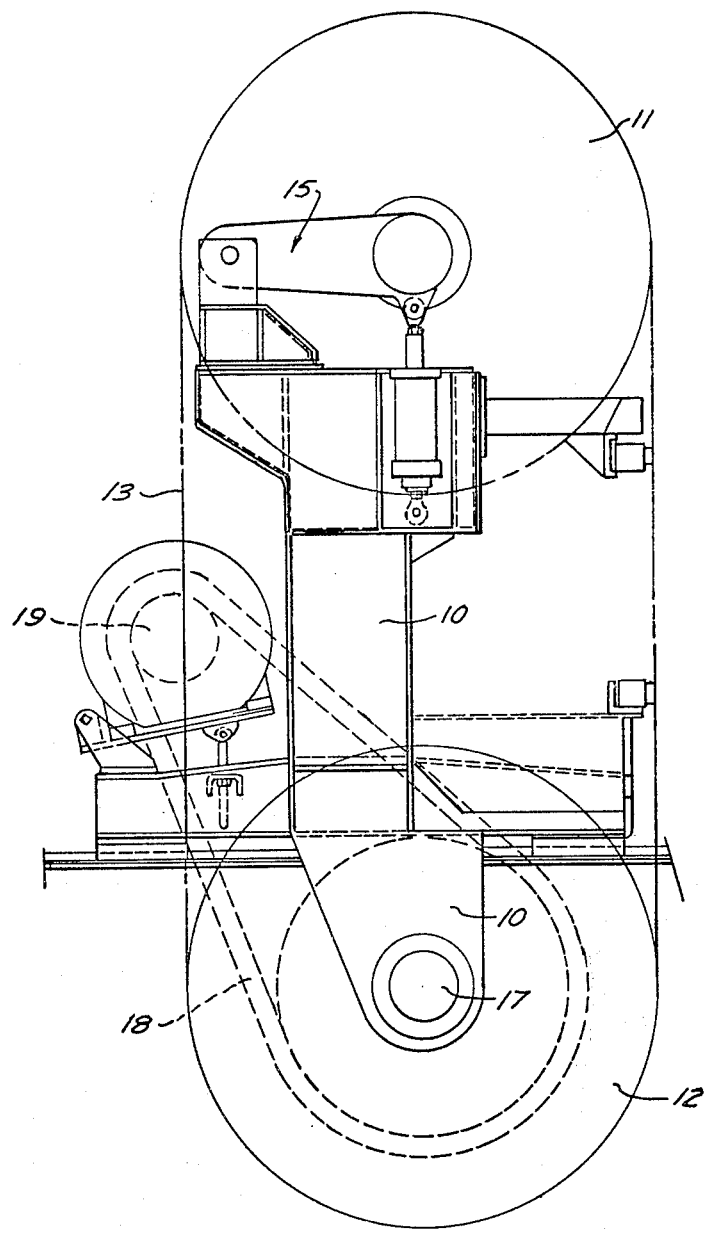
FIG. 2 is a side view thereof.

Referring to the drawings and in particular to FIGS. 1 and 2, the bandsaw apparatus has a frame, generally 10, a tension wheel 11, and a driving wheel 12, mounted directly below, and in tandem with the tension wheel 11. An endless bandsaw 13 is trained over both wheels.

The drive wheel 12, FIG. 3, is mounted for rotation on one end 13.1 of a tubular housing 14 which forms part of the frame and the tension wheel is mounted for rotation on a tensioning device, generally 15, supported by the frame which maintains the bandsaw under high tension. As tensioning devices of this nature are well known, further description is deemed to be unnecessary.

The driving wheel 12 is in driving engagement with one end 16.1 of an axle 16 which extends through the housing and which has mounted, on its other end 17, a pulley 18 which is belt driven from an electric motor 19 mounted in the frame.

Referring particularly to FIG. 3 the driving wheel 12 has an annular hub portion 22 having an inner annular step 23. The tubular housing 14 is reduced in diameter at its end 13.1 to provide a cylindrical boss 24 projecting from an annular abutment face 25. The drive wheel is mounted on the boss and supported for rotation by frictionless bearings 27 and 28 which fit against opposite faces of the step 23. The bearings are restrained against movement longitudinally of the housing by means of an annular flange 21 which is bolted to the end face of the housing and which bears against the bearing 27 and maintains the bearing 28 against the annular abutment face 25. An inner annular flange 33 is bolted to the inner face 34 of the hub portion 22 and also bears against the bearing 28. The flange 33 is provided with ring seals 35 which make slideable sealing contact with the housing. An outer annular cap 37 is bolted to the outer face 38 of the hub and engages the bearing 27. The annular cap 37 is internally splined to receive a correspondingly splined end 39 of the axle 16. An end cap 41 is bolted to the outer end of the annular cap 37 to prevent entrance of foreign material into the bearings and the splined connection of the axle and the cap 37.

The housing, at its opposite end 45, is machined to provide an annular seat for a frictionless bearing 46 which rotatably supports the shaft 17. An annular end cap 48 which is bolted to the end 45 of the housing bears against the bearing 46 and is provided with an annular seal 49 which is in sliding sealing engagement with the shaft.

The end of the shaft 17 projects outwardly out of the housing and has a keyed connection 51 with the hub 52 of the pulley 18.

During operation of the bandsaw apparatus the teeth of the bandsaw discharge sawdust vertically downwards adjacent the driving wheel. The pulley 18 and its associated driving belt are, consequently, not subject to fawling. Furthermore, the axle in fact floats in the housing due to its splined connection with the drive wheel, and, therefore, is not subjected to the stresses imposed on the driving wheel by the bandsaw which is under very high tension.

I claim:

1. Bandsaw apparatus comprising:
   a. a supporting frame,
   b. a transversely disposed tubular housing mounted in the frame,
   c. means for mounting a bandsaw driving wheel for rotation on one end of the tubular housing,
   d. a bandsaw tension wheel mounted for rotation on the supporting frame in tandem with the driving wheel,
   e. a drive shaft extending through the housing and connected at one end, in driving engagement with the driving wheel,
   f. bearing means at the opposite end of the housing for rotatably supporting the drive shaft,
   g. means at the opposite end of the drive shaft for driving the latter.

2. Apparatus as claimed in claim 1 in which the drive shaft has a splined connection with the driving wheel.

* * * * *